(12) United States Patent
Wu et al.

(10) Patent No.: US 8,541,104 B2
(45) Date of Patent: Sep. 24, 2013

(54) INTERMEDIATE TRANSFER MEMBER

(75) Inventors: Jin Wu, Pittsford, NY (US); Jonathan H. Herko, Walworth, NY (US); Lanhui Zhang, Webster, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 223 days.

(21) Appl. No.: 12/886,710

(22) Filed: Sep. 21, 2010

(65) Prior Publication Data

US 2012/0070657 A1  Mar. 22, 2012

(51) Int. Cl.
*B32B 27/20* (2006.01)

(52) U.S. Cl.
USPC .............. 428/421; 399/121; 427/58; 428/422

(58) Field of Classification Search
None
See application file for complete search history.

(56) References Cited

U.S. PATENT DOCUMENTS

| 6,397,034 | B1 * | 5/2002 | Tarnawskyj et al. ........... 399/308 |
| 2010/0149262 | A1 * | 6/2010 | Lin et al. ........................... 347/45 |
| 2012/0041139 | A1 * | 2/2012 | Wu et al. ......................... 524/571 |
| 2012/0201966 | A1 * | 8/2012 | Wu et al. ...................... 427/389.7 |

OTHER PUBLICATIONS

ChemicalBook, Hydroxy Terminated Polybutadiene, 2010, p. 1, http://www.chemicalbook.com/ChemicalProductProperty_EN_CB0274971.htm.*

* cited by examiner

*Primary Examiner* — Callie Shosho
*Assistant Examiner* — Patrick English
(74) *Attorney, Agent, or Firm* — Hoffman Warnick LLC

(57) ABSTRACT

There is described an intermediate transfer member including a substrate layer comprising a polyimide and a surface layer. The surface layer includes a functionalized polyfluoropolyether and functionalized polybutadiene in a weight ratio of functionalized polyfluoropolyether/functionalized polybutadiene of from about 20/80 to about 80/20 and conductive particles. The method of manufacturing the intermediate transfer member is also described.

17 Claims, 2 Drawing Sheets

INTERMEDIATE TRANSFER MEMBER

BACKGROUND

1. Field of Use

This disclosure is generally directed to a novel surface layer useful in electrophotographic imaging apparatuses, including digital, image on image, and the like. In addition, the surface coating has application in ink jet print heads and transfer drums.

2. Background

In electrophotographic printing and ink jet printing certain components require surfaces that are uniform, have a low surface energy and are durable. A surface layer having such properties is useful.

Hydrophobic and oleophobic layers are desirable for toner transfer and cleaning efficiency. Fluorinated polymeric layers typically possess the required hydrophobic characteristics; however, the oleophobic characteristics are not suitable for certain electrophotographic and ink jet printing components. Surface layers that are both hydrophobic and oleophobic are continuously being sought.

High speed machines typically require multi-layer intermediate transfer members that separate the layer functions. For example, dual polyimide layer intermediate transfer belts (ITBs) are common in the industry. The common design is to provide a polyimide base layer plus a functional surface layer, where the polyimide base layer provides mechanical integrity, while the surface layer provides certain functionality such as low surface energy.

The top layer or surface layer usually comprises a fluoropolymer such as fluoroelastomer or a fluoroplastic, which is hydrophobic and somewhat oleophobic. Surface layers that are more oleophobic provide better toner transfer and cleaning efficiency. A surface layer having a higher oleophobic property is desirable.

SUMMARY

According to an embodiment, there is described an intermediate transfer member including a substrate layer comprising a polyimide and a surface layer. The surface layer includes a functionalized polyfluoropolyether and functionalized polybutadiene in a weight ratio of functionalized polyfluoropolyether/functionalized polybutadiene of from about 20/80 to about 80/20 and conductive particles.

According to another embodiment, there is described a method of making an intermediate transfer member comprising adding and reacting functionalized polyfluoropolyether, functionalized polybutadiene, a solvent, conductive particles and a catalyst to provide a coating composition of functionalized polyfluoropolyether and functionalized polybutadiene in a weight ratio of from about 20 to 80 to about 80 to 20. The coating composition is coated on a polyimide substrate. The coating composition is cured to form a surface layer on the polyimide substrate.

According to another embodiment there is described an intermediate transfer member comprising a substrate layer comprising polyimide and a surface layer. The surface layer comprises functionalized polyfluoropolyether and functionalized polybutadiene in a weight ratio of functionalized polyfluoropolyether/functionalized polybutadiene of from about 20/80 to about 80/20 and carbon black. The surface layer comprises a water contact angle of greater than about 90° and a hexadecane contact angle of greater than about 50°.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
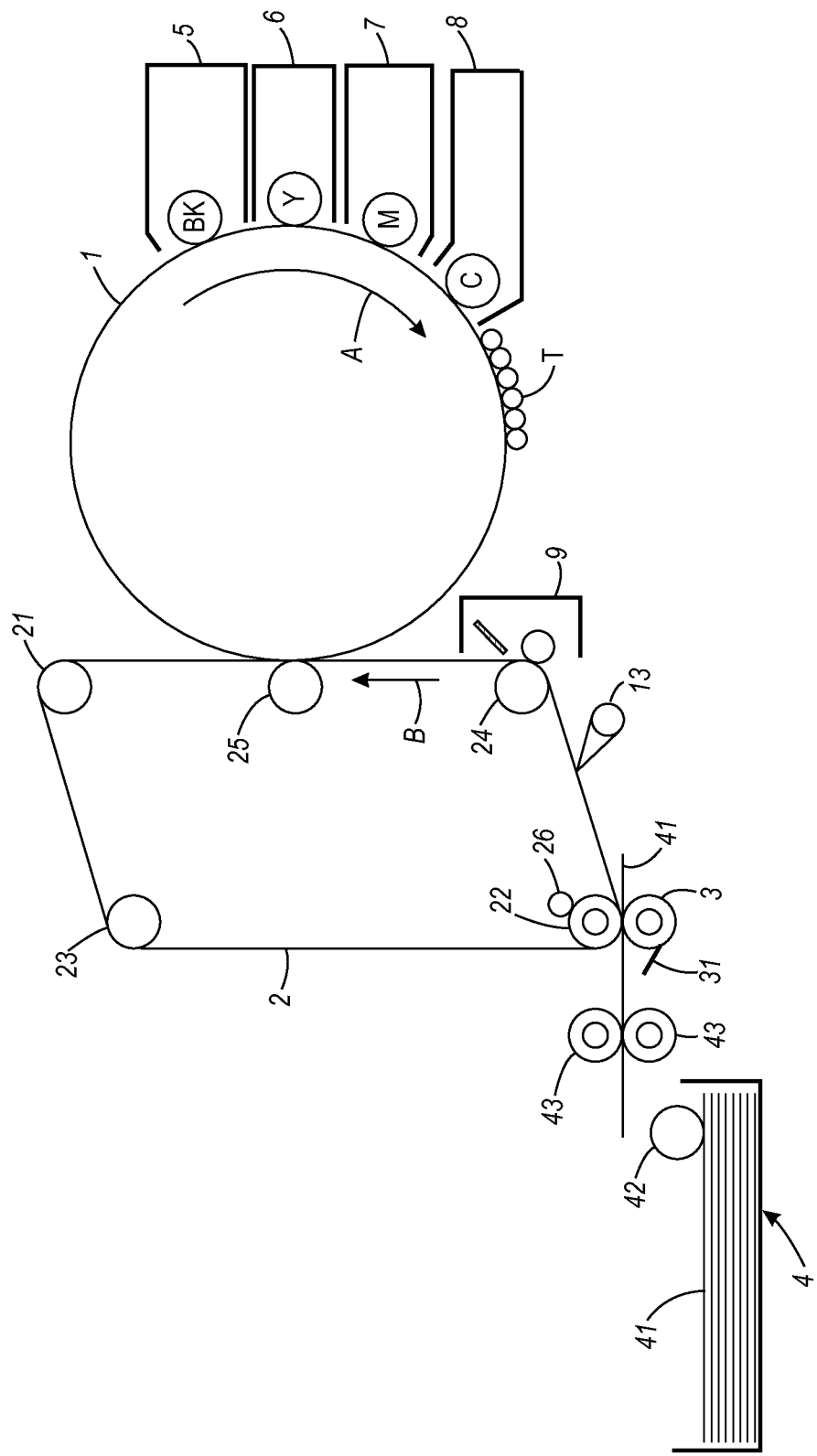
FIG. 1 is a schematic illustration of an image apparatus.

It should be noted that some details of the figures have been simplified and are drawn to facilitate understanding of the embodiments rather than to maintain strict structural accuracy, detail, and scale.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "hydrophobic/hydrophobicity" and the term "oleophobic/oleophobicity" refer to the wettability behavior of a surface that has, e.g., a water contact angle of approximately 90° or more and hexadecane (or hydrocarbons, silicone oils, etc.) contact angle of approximately 50° or more, respectively. For example, on a hydrophobic/oleophobic surface, a ~10-15 µL water drop can bead up and have an equilibrium contact angle of approximately 90° or greater; and a ~10-15 µL hexadecane drop can bead up and have an equilibrium contact angle of approximately 50° or greater Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be the same as the first transfer unit such as a contact type transfer charger using transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as a transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with the backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Figure 2:
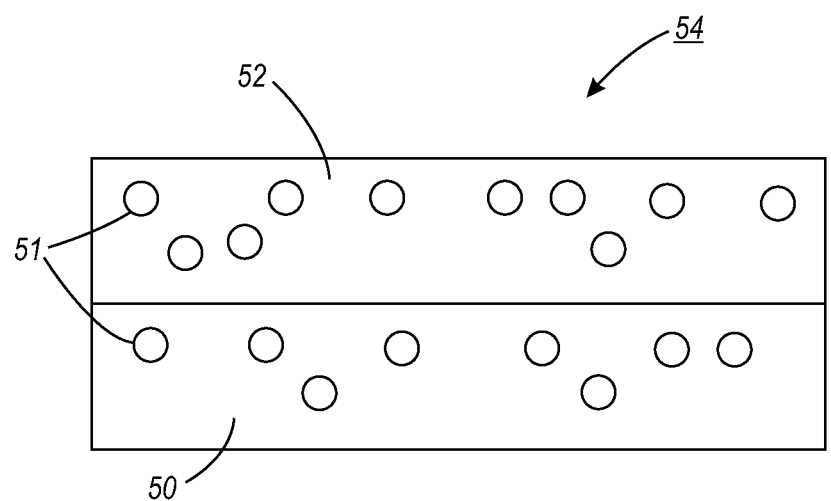
FIG. 2 is a schematic representation of an embodiment disclosed herein.

In an embodiment shown in FIG. 2, the intermediate transfer member 54 is in the form of a film in a two layer configuration. The intermediate transfer member 54 includes a substrate layer 50 comprising polyimide. A surface layer 52, that is both hydrophobic and oleophobic, is disposed on top of the substrate layer 50. The surface layer 52 comprises a polyfluoropolyether (PFPE)/polybutadiene composite having conductive particles 51 dispersed therein. The substrate layer 50 can also contain conductive filler particles 51. The conductive particles 51 are optional and used to control the conductivity.

Suitable polyimides for the substrate layer 50 include those formed from various diamines and dianhydrides, such as poly(amide-imide), polyetherimide, siloxane polyetherimide block copolymer such as, for example, SILTEM STM-1300 available from General Electric, Pittsfield, Mass., and the like. For example, polyimides that include aromatic polyimides such as those formed by the reacting pyromellitic acid and diaminodiphenylether are sold under the tradename KAPTON®-type-HN, available from DuPont. Another suitable polyimide available from DuPont and sold as KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane available as EYMYD type L-20N from Ethyl Corporation, Baton Rouge, La. Other suitable aromatic polyimides include those containing 1,2,1',2'-biphenyltetracarboximide and para-phenylene groups such as UPILEX®-S available from Uniglobe Kisco, Inc., White Planes, N.Y., and those having biphenyltetracarboximide functionality with diphenylether end spacer characterizations such as UPILEX®-R also available from Uniglobe Kisco, Inc. Mixtures of polyimides can also be used. More commercial polyimide examples that can be used as the substrate layer 50 include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.

The surface layer 52 is obtained by reacting hydroxyl terminated PFPE with an isocyanate terminated polybutadiene under the catalysis of an organo tin compound. The surface layer 52 exhibited a water contact angle of greater than about 90° to about 140° or from about about 100° to about 120°, or greater than about of about 110°; and a hexadecane contact angle of from about 50° to about 120°, or from about 60° to about 90°, or greater than about 70°. As comparison, a PTFE surface layer usually exhibits a water contact angle of about 110°, and a hexadecane contact angle of about 45°.

The surface layer is prepared by coating and curing a mixture of a functionalized polyfluoropolyether (PFPE)/functionalized polybutadiene composite in a weight ratio of from about 20/80 to about 80/20, or from about 25/75 to about 60/40, or from about 30/70 to about 45/55, in a solvent on a polyimide substrate. The coating composition includes conductive particles.

The functionalized PFPE reacts with a functionalized polybutadiene. The reaction can be promoted by using a catalyst. The reaction of the functionalized PFPE with the functionalized polybutadiene under catalysis in a solvent is conducted at from about 100° C. to about 250° C., or from about 120° C. to about 200° C., or from about 140° C. to about 175° C. for a period of from about 10 to about 120 minutes, or from about 20 to about 90 minutes, or from about 30 to about 60 minutes.

The surface layer resulting from the coating composition is a cross-linked network of functionalized polyfluoropolyether and functionalized polybutadiene in a weight ratio of functionalized polyfluoropolyether/functionalized polybutadiene of from about 20/80 to about 80/20, or from about 25/75 to about 60/40, or from about 30/70 to about 45/55. The surface layer has a water contact angle of from about 90° to about 140°, or from about 100° to about 120°, or greater than about 110° and a hexadecane contact angle of from about 45° to about 120°, or from about 55° to about 90°, or greater than about 65°.

The functionalized polyfluoropolyether (PFPE) is represented by the formula below:

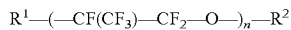

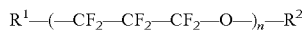

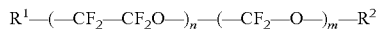

wherein n and m each represent the number of repeating groups, and n is from about 3 to about 120, or from about 10 to about 60; m is from about 5 to about 120, or from about 10 to about 60; and n+m is from about 40 to about 180, or from about 80 to about 125, n/m is from about 0.5 to about 2; $R^1$ and $R^2$ are the same or different and are independently represented by $A^1$-$CF_2$O— and —$CF_2$-$A^2$, respectively, and $A^1$, $A^2$ are independently one of

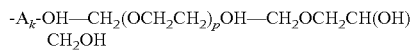

wherein $A_k$ is a bond or an alkylene group with from about 1 to 10 carbon atoms, or from about 1 to about 5 carbon atoms; $R_H$ is H, or an alkyl group with from about 1 to about 10 carbon atoms or from about 1 to about 5 carbon atoms; and p is from 1 to about 20 or from about 5 to about 15.

The functionalized PFPE that can be used in the coating composition include hydroxyl terminated PFPE, carboxyl acid or ester terminated PFPE, silane terminated PFPE, or phosphoric acid terminated PFPE, having a weight average molecular weight of from about 100 to about 5,000, or from about 500 to about 2,000, present in an amount of from about 20 to about 80 weight percent, or from about 25 to about 60 weight percent, or from about 30 to about 45 weight percent of the coating composition.

Examples of the hydroxyl terminated PFPE that can be used in the coating composition include FLUOROLINK® D ($M_w$=1,000, functional group —$CH_2OH$ and fluorine content ~62%), FLUOROLINK® D10-H ($M_w$=700, functional group —$CH_2OH$ and fluorine content ~61%), FLUOROLINK® D10 ($M_w$=500, functional group —$CH_2OH$ and fluorine content ~60%), FLUOROLINK® E ($M_w$=1,000, functional group —$CH_2(OCH_2CH_2)_pOH$ and fluorine content ~58%), FLUOROLINK® E10 ($M_w$=500, functional group —$CH_2(OCH_2CH_2)_pOH$ and fluorine content ~56%), FLUOROLINK® T ($M_w$=550, functional group —$CH_2OCH_2CH(OH)CH_2OH$ and fluorine content ~58%), FLUOROLINK® T10 ($M_w$=330, functional group —$CH_2OCH_2CH(OH)CH_2OH$ and fluorine content ~55%) and the like and mixtures thereof, all commercially available from Ausimont USA.

Examples of the carboxyl acid or ester terminated PFPE that can be used in the coating composition include FLUOROLINK® C ($M_w$=1,000, functional group —COOH and fluorine content ~61%), FLUOROLINK® L ($M_w$=1,000, functional group —$COOR_H$ and fluorine content ~60%), FLUOROLINK® L10 ($M_w$=500, functional group —$COOR_H$ and fluorine content ~58%), and the like and mixtures thereof, all commercially available from Ausimont USA.

Examples of the silane terminated PFPE that can be used in the coating composition include FLUOROLINK® S10 ($M_w$=1,750 to 1,950, functional group -$A_k$-Si($OCH_2CH_3$)$_3$), and the like and mixtures thereof, commercially available from Ausimont USA.

Examples of the phosphoric acid terminated PFPE that can be used in the coating composition include FLUOROLINK® F10 ($M_w$=2,400 to 3,100, functional group -$A_k$-OP(O)(OH)$_2$), and the like and mixtures thereof, commercially available from Ausimont USA.

The functionalized polybutadiene (PBD) that can be used in the coating composition include isocyanate PBD, hydroxyl PBD, carboxyl acid or ester PBD, or epoxy PBD, having a weight average molecular weight of from about 200 to about 10,000, or from about 500 to about 5,000, present in an amount of from about 80 to about 20 weight percent, or from about 75 to about 40 weight percent, or from about 70 to about 55 weight percent of the coating composition.

The polybutadiene (PBD) backbone of the functionalized PBD can be poly(1,3-butadiene), poly(1,4-butadiene), hydrogenated poly(1,3-butadiene), hydrogenated poly(1,4-butadiene), and mixtures thereof.

Examples of the isocyanate PBD that can be used in the coating composition include KRASOL® NN-35, NN-25, NN-22, NN-32, NN-23, NN-3A and LBD2000, all commercially available from Sartomer Company, Warrington, Pa.

Examples of the hydroxyl PBD that can be used in the coating composition include KRASOL® HLBH-P2000 (hydroxyl hydrogenated PBD), HLBH-P3000 (hydroxyl hydrogenated PBD), LBH-P2000, LBH-P3000, LBH-P5000, LBH 2000, LBH 3000, LBH 5000, LBH 10000, LBH 2040 (mercaptoethanol PBD), POLY BD® R45HT, R45M, R45HTLO, LFM, R20LM, and R30LM, all commercially available from Sartomer Company, Warrington, Pa.

Examples of the carboxyl or ester PBD that can be used in the coating composition include POLY BD® 45CT, 2000CT, 3000CT, KRASOL® LBM-32 (maleic and umaric acid half-ester PBD), and LBM-22 (maleic and umaric acid half-ester PBD), all commercially available from Sartomer Company, Warrington, Pa.

Examples of the epoxy PBD that can be used in the coating composition include POLY BD® 700, and 700E, both commercially available from Sartomer Company, Warrington, Pa.

The functionalized PFPE can chemically react with the functionalized PBD to form a crosslinked PFPE/PBD composite. For examples, the hydroxyl terminated PFPE reacts with the isocyanate PBD to form the urethane linkages between the PFPE and the PBD; or the hydroxyl terminated PFPE reacts with the carboxyl or ester PBD to form the ester linkages between the PFPE and the PBD; or the hydroxyl terminated PFPE reacts with the epoxy PBD to form the ether linkages between the PFPE and the PBD; or the carboxyl or ester terminated PFPE reacts with the isocyanate PBD to form the carbamate linkages between the PFPE and the PBD; or the carboxyl or ester terminated PFPE reacts with the hydroxyl PBD to form the ester linkages between the PFPE and the PBD; or the carboxyl or ester terminated PFPE reacts with the epoxy PBD to form the ester linkages between the PFPE and the PBD; or the silane terminated PFPE reacts with the hydroxyl PBD to form the silane linkages between the PFPE and the PBD; or the phosphoric acid terminated PFPE reacts with the isocyanate PBD to form the phosphate linkages between the PFPE and the PBD; or the phosphoric acid terminated PFPE reacts with the hydroxyl PBD to form the phosphate linkages between the PFPE and the PBD; or the phosphoric acid terminated PFPE reacts with the epoxy PBD to form the phosphate linkages between the PFPE and the PBD. Among them, the combination of hydroxyl terminated PFPE/isocyanate PBD, carboxyl acid or ester terminated PFPE/hydroxyl PBD or carboxyl acid or phosphoric acid terminated PFPE/isocyanate PBD is preferred.

Suitable catalysts for the composition include organo tin catalysts such as dibutyltin laurate, acid catalysts such as p-toluenesulfonic acid, or base catalysts such as triethylamine, present in an amount of from about 0.01 to about 5 weight percent, or from about 0.1 to about 1 weight percent of the coating composition.

Although most of the above functionalized PFPE and PBD are in liquid form, certain solvents can be added to the coating mixture to facilitate the mixing. Suitable solvents for the coating mixture include N,N-dimethylformamide, N-methylpyrrolidone, tetrahydrofuran, toluene, hexane, cyclohexane, heptane, N,N'-dimethylacetamide, methylene chloride and mixtures thereof, present in an amount of from about 10 to about 90 weight percent, or from about 30 to about 60 weight percent of the coating composition. When coated on a substrate followed by subsequent drying, the solvent evaporates and the functionalized PFPE/functionalized PBD crosslinks, resulting in the formation of a crosslinked PFPE/PBD coating composition.

It is theorized that since the fluoro segments (PFPE) and the hydrocarbon segments (polybutadiene) are chemically linked at the ends, macro phase separation is prevented. However, micro phase separation occurs in the coating composite, which results in a hydrophobic and oleophobic coating.

Certain electrically conductive particles 51 dispersed in both the polyimide substrate layer 50 and the surface layer 52, in embodiments decrease the resistivity into the desired surface resistivity range of from about $10^9$ ohms/square to about $10^{13}$ ohms/square, or from about $10^{10}$ ohms/square to about $10^{12}$ ohms/square. The volume resistivity is from about $10^8$ ohm-cm to about $10^{12}$ ohm-cm, or from about $10^9$ ohm-cm to about $10^{11}$ ohm-cm. The resistivity can be provided by varying the concentration of the conductive particles.

Examples of conductive fillers include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, polyanilines and polythiophenes, and mixtures thereof. The conductive filler may be present in an amount of from about 1 to about 60 and or from about 3 to about 40, or from about 5 to about 20 parts by weight of total solids of the intermediate transfer member.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is primarily dependent on surface area and its structure, generally the higher the surface area and the higher the structure, the more conductive the carbon black. Surface area is measured by the B.E.T. nitrogen surface area per unit weight of carbon black, and is the measurement of the primary particle size. The surface area of the carbon black described herein is from about 460 m$^2$/g to about 35 m$^2$/g. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

Further examples of conductive fillers include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC® ECP-S, M and T) and those antimony doped tin oxides without a core particle (e.g., ZELEC® ECP-3005-XC and ZELEC® ECP-3010-XC, ZELEC® is a trademark of DuPont Chemicals Jackson Laboratories, Deepwater, N.J.). The core particle may be mica, TiO$_2$ or acicular particles having a hollow or a solid core.

In another embodiment, the electrically conductive particles include antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, TiO$_2$ or acicular particles having a hollow or a solid core.

In another embodiment, antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electro-conductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M).

The coating mixture or solution is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

For example, a coating mixture or solution can be prepared by mixing about 30 weight percent of an isocyante polybutadiene, about 15 weight percent of a hydroxyl terminated polyfluoropolyether, about 0.5 weight percent of dibutyltin laurate, about 4.5 weight percent conductive particles and about 50 weight percent of tetrahydrofuran together for a period of from about 5 to about 30 minutes. The resulting coating mixture or solution was draw bar coated on a 75 micron polyimide film, and subsequently dried at temperatures of from about 120 to about 200° C. for a period of from about 10 to about 60 minutes. A coating composition of polybutadiene/polyfluoropolyether/dibutyltin laurate/conductive particles=60/30/1/9 is formed on top of the polyimide substrate with a thickness of from about 1 to about 100 microns.

Specific embodiments will now be described in detail. These examples are intended to be illustrative, and not limited to the materials, conditions, or process parameters set forth in these embodiments. All parts are percentages by solid weight unless otherwise indicated.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

EXAMPLES

An intermediate transfer belt (ITB) surface layer coating dispersion was prepared in the following weight ratio; PFPE/polybutadiene/carbon black=30/65/5. The hydroxyl terminated PFPE (Fluorolink® D, Solvay) was mixed with the isocyanate polybutadiene (Krasol® NN-35, Sartomer) and the carbon black (color black FW-1, Degussa) and small amounts of the tin catalyst, dibutyltin laurate. The tin catalyst accelerated the crosslinking reactions between the hydroxyl PFPE and the isocyanate polybutadiene The dispersion was coated on top of a polyimide bottom layer (LWPS, 75 μm thick, KAPTON® KJ/PANI from Du Pont), and then thermally cured at 150° C. for 30 minutes. The disclosed surface layer of about 10 μm was formed with functional resistivity, and excellent adhesion to the polyimide bottom layer. The dual layer ITB was flat with no curl and no stretch. The surface layer possessed a surface resistivity of about $7.8 \times 10^9$ ohm/sq, and a pencil hardness of 1H, indicating good mechanical property due to its cross-linking nature.

The composite layer was further tested for contact angles, and the results were shown in Table 1, and the data of PTFE as well as a polyimide ITB itself were also included for comparison.

TABLE 1

|  | Composite Layer | The PTFE layer | The polyimide/carbon black ITB |
|---|---|---|---|
| Water contact angle | 112° ± 1° | 110° | 75° |
| Hexadecane contact angle | 70° ± 1° | 45° | 10° |

When compared with a single layer polyimide ITB, the composite ITB was much more hydrophobic and oleophobic. When compared with a PTFE layer, the disclosed dual layer ITB was comparably hydrophobic, however, still more oleophobic.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A intermediate transfer member comprising:
a substrate layer comprising polyimide; and
a surface layer comprising a polymer consisting of functionalized polyfluoropolyether and functionalized polybutadiene wherein the functionalized polybutadiene is selected from the group consisting of an isocyanate polybutadiene, a hydroxyl polybutadiene, a carboxyl acid polybutadiene, an ester polybutadiene, or an epoxy polybutadiene and wherein said polybutadiene is selected from the group consisting of poly(1,3-butadiene), poly(1,4-butadiene), hydrogenated poly(1,3-butadiene) and hydrogenated poly(1,4-butadiene), in a weight ratio of functionalized polyfluoropolyether/functionalized polybutadiene of from about 20/80 to about 80/20, and conductive particles.

2. The intermediate transfer member of claim 1 wherein the functionalized polyfluoropolyether is represented by:

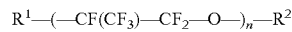

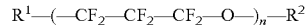

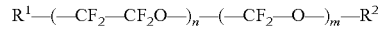

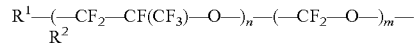

wherein n and m each represent the number of repeating groups, n is from about 3 to about 120, m is from about 5 to about 120, n+m is from about 40 to about 180, n/m is from about 0.5 to about 2, $R^1$ and $R^2$ are independently represented by $A^1$-$CF_2O$— and —$CF_2$-$A^2$, respectively, $A^1$, $A^2$ are independently one of -$A_k$-OH—$CH_2$($OCH_2CH_2$)$_p$OH—$CH_2OCH_2CH(OH)$
$CH_2OH$

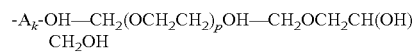

wherein $A_k$ is a bond or an alkylene group with from about 1 to about 10 carbon atoms, $R_H$ is H, or an alkyl group with from about 1 to about 10 carbon atoms; and p is from 1 to about 20.

3. The intermediate transfer member of claim 1 wherein the functionalized polyfluoropolyether is selected from the group consisting of a hydroxyl terminated polyfluoropolyether, a carboxyl acid terminated polyfluoropolyether, an ester terminated polyfluoropolyether, a silane terminated polyfluoropolyether, and a phosphoric acid terminated polyfluoropolyether.

4. The intermediate transfer member of claim 1 wherein the surface layer has a hexadecane contact angle of greater than about 50°.

5. The intermediate transfer member of claim 1 wherein the conductive particles are present in an amount of from about 1 to about 60 weight percent based on total weight of the surface layer.

6. The intermediate transfer member of claim 1 wherein the conductive particles are selected from the group consisting of carbon black, tin oxide, antimony dioxide, antimony-doped tin oxide, titanium dioxide, indium oxide, zinc oxide, indium oxide and indium-doped tin trioxide, polyaniline and polythiophene.

7. The intermediate transfer member of claim 1 wherein the surface layer has a thickness of from about 1 micron to about 400 microns.

8. A method of making an intermediate transfer member comprising:
   a) adding and reacting a mixture consisting of functionalized polyfluoropolyether, functionalized polybutadiene wherein the functionalized polybutadiene is selected from the group consisting of an isocyanate polybutadiene, a hydroxyl polybutadiene, a carboxyl acid polybutadiene, an ester polybutadiene, or an epoxy polybutadiene and wherein said polybutadiene is selected from the group consisting of poly(1,3-butadiene), poly(1,4-butadiene), hydrogenated poly(1,3-butadiene) and hydrogenated poly(1,4-butadiene), a solvent, conductive particles and a catalyst to provide a coating composition of functionalized polyfluoropolyether and functionalized polybutadiene in a weight ratio of from about 20 to 80 to about 80 to 20;
   b) coating the coating composition on a polyimide substrate; and
   c) curing the coating composition to form a surface layer.

9. The method of claim 8 wherein the catalyst is selected from the group consisting of an organotin compound, an acid catalyst, and a base catalyst.

10. The method of claim 8 wherein the catalyst is present in an amount from about 0.01 weight percent to about 5.0 weight percent of the coating composition.

11. The method of claim 8 wherein the solvent is selected from the group consisting of N,N-dimethylformamide, N-methylpyrrolidone, tetrahydrofuran, toluene, hexane, cyclohexane, heptane, N,N'-dimethylacetamide, methylene chloride and mixtures thereof.

12. The method of claim 8 wherein the solvent is present in an amount from about 10 weight percent to about 90 weight percent of the coating composition.

13. The method of claim 8 wherein the functionalized polyfluoropolyether is represented by:

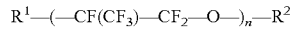

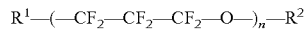

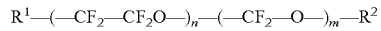

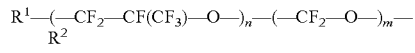

wherein n and m each represent the number of repeating groups, n is from about 3 to about 120, m is from about 5 to about 120, n+m is from about 40 to about 180, n/m is from about 0.5 to about 2, $R^1$ and $R^2$ are independently represented by $A^1$-$CF_2O$— and —$CF_2$-$A^2$, respectively, $A^1$, $A^2$ are independently one of

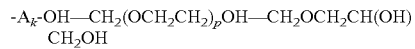

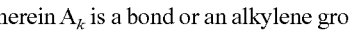

wherein $A_k$ is a bond or an alkylene group with from about 1 to about 10 carbon atoms, $R_H$ is H, or an alkyl group with from about 1 to about 10 carbon atoms, and p is from 1 to about 20.

14. The method of claim 8 wherein the functionalized polyfluoropolyether is selected from the group consisting of hydroxyl terminated polyfluoropolyether, a carboxyl acid terminated polyfluoropolyether, an ester terminated polyfluoropolyether, a silane terminated polyfluoropolyether, and a phosphoric acid terminated polyfluoropolyether.

15. The method of claim 8 wherein the surface layer has a hexadecane contact angle greater than about 50°.

16. A intermediate transfer member comprising:
   a substrate layer comprising polyimide; and
   a surface layer comprising a polymer consisting of functionalized polyfluoropolyether and functionalized polybutadiene wherein the functionalized polybutadiene is selected from the group consisting of an isocyanate polybutadiene, a hydroxyl polybutadiene, a carboxyl acid polybutadiene, an ester polybutadiene, or an epoxy polybutadiene and wherein said polybutadiene is selected from the group consisting of poly(1,3-butadiene), poly(1,4-butadiene), hydrogenated poly(1,3-butadiene) and hydrogenated poly(1,4-butadiene), in a weight ratio of functionalized polyfluoropolyether/functionalized polybutadiene of from about 20/80 to about 80/20, and carbon black wherein the surface layer comprises a water contact angle of greater than about 110° and a hexadecane contact angle of greater than about 50°.

17. The intermediate transfer member of claim 16 wherein the carbon black is present in an amount of from about 1 to about 60 weight percent based on total weight of the surface layer.

* * * * *